United States Patent [19]

Beckerick et al.

[11] 4,419,196

[45] Dec. 6, 1983

[54] PRODUCTION OF MOLDED PRODUCTS BASED UPON A TWO-COMPONENT HYDRAULIC MINERAL RESIN

[76] Inventors: Philippe J. Beckerick, 44 rue J. Ferry, Follainville, France, 78200; Patrice R. Hamelin, 6 rue Chambfort, Villeurbanne, France, 69100; André R. Fumez, Le Bourg d'en Haut, Bons en Chablais, France, 74140

[21] Appl. No.: 247,328

[22] Filed: Mar. 25, 1981

[51] Int. Cl.³ .......................... B06B 3/00; C04B 9/02; C04B 70/2
[52] U.S. Cl. ..................... 204/157.1 R; 204/157.1 H; 106/106; 106/286.6; 264/23; 264/42
[58] Field of Search ............... 106/286.6, 106; 264/23, 264/42; 204/157.1 R, 157.1 H

[56] References Cited

U.S. PATENT DOCUMENTS

| | | | |
|---|---|---|---|
| 2,712,512 | 7/1955 | Biefeld | 154/86 |
| 3,340,079 | 9/1967 | Bryant | 106/106 |
| 3,778,304 | 12/1973 | Thompson | 264/42 |
| 4,096,944 | 6/1978 | Simpson | 106/106 |
| 4,141,744 | 2/1979 | Prior et al. | 106/106 |

*Primary Examiner*—T. Morris
*Attorney, Agent, or Firm*—Weiser & Stapler

[57] ABSTRACT

Molded products based on a two-component mineral resin are produced, starting from a mixture of magnesium oxide, magnesium chloride, and water by triggering therein through mechanical or electromagnetic vibrations an abrupt exothermic reaction, which propagates through the entire mass and causes it to set and harden spontaneously and without additional heat supply.

7 Claims, 5 Drawing Figures

PRODUCTION OF MOLDED PRODUCTS BASED UPON A TWO-COMPONENT HYDRAULIC MINERAL RESIN

The invention relates to improvements in the production of molded products based upon a two-component hydraulic mineral resin which has been heat hardened.

By two-component hydraulic mineral resin there is understood more particularly that which is obtained starting from a mixture of magnesium oxide and magnesium chloride, as well as that which is obtained starting from magnesium oxide and magnesium sulfate.

These raw materials are very well known, especially as constituting binders which are most frequently called oxichlorides or oxisulfates of magnesium.

For several years it has been attempted to make the use of such products commercially useful because of certain properties such as their low cost and their natural non-flammability.

However, this commercialization research has never led to any significant development, because of difficulties encountered in the manufacture of finished products using the said raw materials.

The principal ones of these difficulties stem from the dimensional instability of the finished molded or shaped products using such magnesium components, the slowness of obtaining a useful product, and the near impossibility of obtaining pieces or objects of large dimensions and complex shapes.

Moreover, it is noted that such magnesium products have had only a limited development in their cellular structural variety, even though there do exist prior publications concerning these technologies.

This phenomenon is primarily due to a lack of control over the expansion process.

As regards the products which have a homogeneous and non-foamed structure, there can be cited as the closest state of the art U.S. Pat. No. 2,712,512. In that patent there is described a manufacturing process for thin sheets reinforced with glass fibers.

If one refers to the preparation examples specified in that patent, one is struck by the proportions of the components.

If one attempts to put any one of these formulas into practice, mixtures are obtained which are hard to manipulate, and this makes the process unprofitable. For proof, there is the 6 day stabilization time indicated in the patent before the products so obtained can be used.

As regards the products having an expanded structure, based on magnesium components, reference is made to U.S. Pat. No. 3,778,304, in which there is produced a magnesium oxichloride foam by addition to the composition of a metallic magnesium powder, which manifests itself during the expansion process by a hydrogen evolution which is dangerously flammable and even explosive, thereby precluding its use in practice.

In addition, the degree of expansion remains low, due to the limited quantities of magnesium which can be used without running serious risks. In that case, the formation of the foam always takes long and its dimensionally stability is irregular.

The present invention has as its principal object to overcome these difficulties by providing a manufacturing process for molded or shaped products which are based on oxichloride or oxisulfate of magnesium as the binder, having a homogeneous or cellular structure, and providing high dimensional stability both linearly and volumetrically, regardless of the size of the products obtained and, above all, with a very short time to achieve their ultimate strength.

It will also be noted that thin products, such as laminates, are extremely difficult to obtain due to the above-mentioned dimensional instability because one observes, for such products, a "bi-metal"-like effect, i.e., in the case of a flat element, a barrel distortion. The invention therefore also has as its object to provide elements which are stable over time and which have the desired initial shape.

The present invention is based on the discovery of a new method of accelerated hardening of the magnesium binder, in which setting of the mixture is assured by triggering an abrupt exothermic reaction at any point within the product to be hardened, and which is capable of reaching a temperature of 180° C. in a period of time which lies between 15 and 60 minutes, whereas in the prior state of the art the hardening is obtained by oven heat of 50° to 100° C., always requiring a supplemental hardening period which varies between 1 and 6 days as a function of the composition formulas involved.

In accordance with the invention, the process for manufacture of molded products, whether or not expanded, based on a two-component mineral resin, preferably a mixture of magnesium oxide and magnesium chloride and water to form a binder which is pourable or moldable, is characterized in that, on the one hand, there is prepared a hydraulic binder by producing a mixture which principally comprises:
20 to 30% of magnesium chloride
70 to 80% of magnesium oxide
and to these raw material components there is added a quantity of water between 10 and 35%, on the other hand, for the setting and hardening of the mixture, there is triggered an abrupt exothermic reaction by subjecting that mixture to mechanical or electromagnetic vibrations, including waves of heat, light or nuclear energy, to trigger the exothermic reaction phase.

This process has the unexpected consequence of producing, in the core of the material, starting from a point of origin, a temperature rise which progresses in characteristic manner along an exponential curve having a sharp peak, this reaction propagating through the entire mass of the product and being accompanied by a modification of the structure of the product so obtained, such as is discernible particularly by x-ray analysis.

In accordance with an embodiment of the invention, the exothermic reaction in the core of the two-component raw material mixture is triggered by subjecting it to an ultraviolet radiation source.

In accordance with another embodiment, before the triggering of the exothermic reaction phase, there is introduced into the mixture an expansion agent, preferably in the liquid state, and particularly the halogen derivatives of methane and ethane, and the exothermic reaction is utilized to insure that the setting of the material in the expanded state takes place during the period of foaming.

By this new technique the expansion of the binder and consequently its density are completely controlled, which is not taught in the known state of the art.

Other embodiments and advantages will appear further from the detailed description which follows, of examples of how to practice the invention, and from the accompanying drawings wherein.

Figure 1:
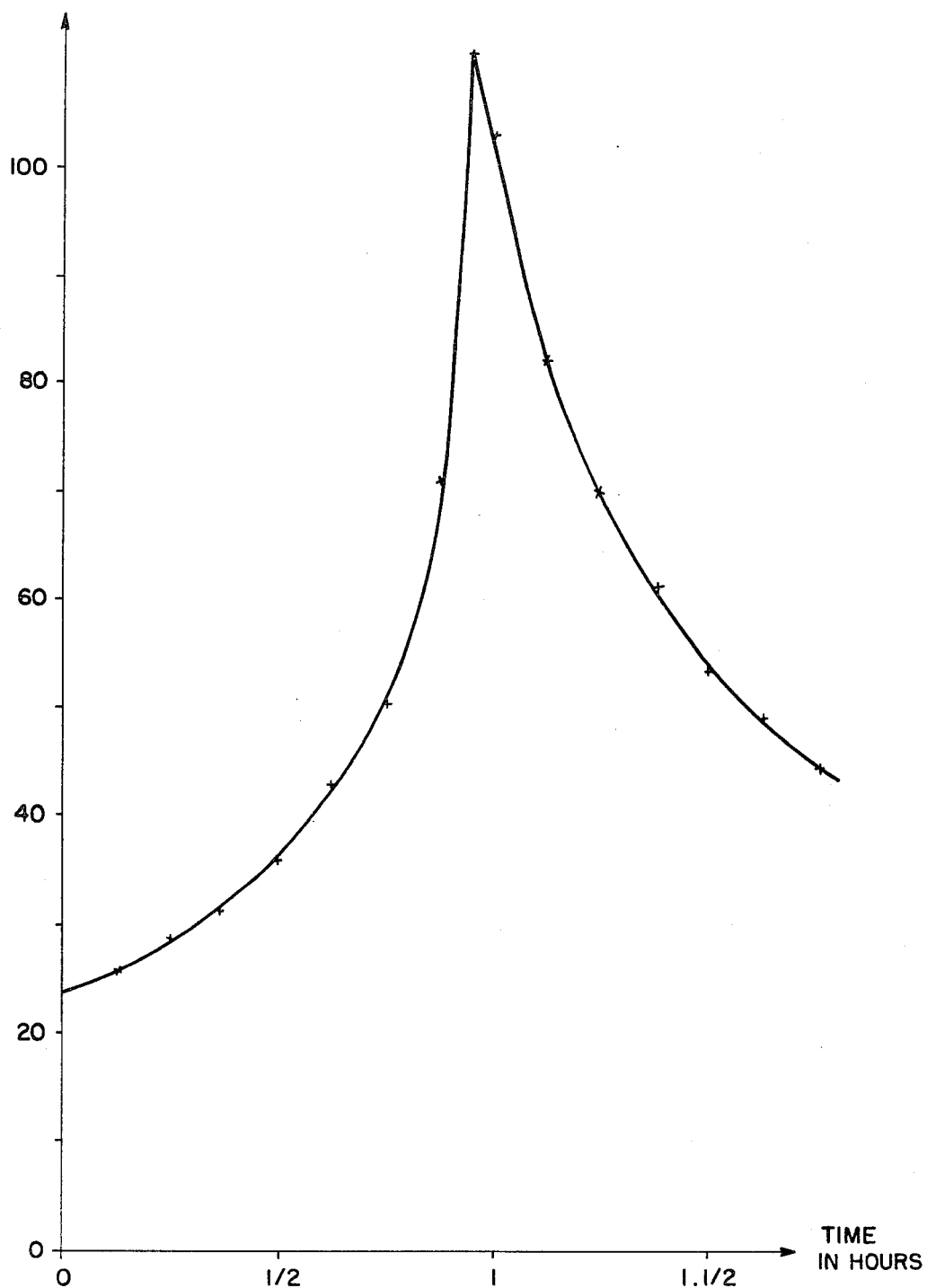
FIG. 1 is a view showing a temperature curve illustrating the exothermic reaction.

In accordance with the invention, the present process finds applications, in addition to moldable cladding layers and their derivatives in the production of thin laminates, of self-supporting enclosures, and of any moldable shape.

The process consists first of all in preparing a two-component hydraulic resin, constituted of a mixture of magnesium oxide and magnesium chloride to form a pure paste, intended to be molded or shaped and utilizable in that state, or else to constitute a surface skin, for example for a sandwich panel adapted to form a bearing wall, a roof tile, a floor tile, etc.

To obtain a pure paste, one can start with an average composition comprising 7 parts by weight of magnesium chloride, which is mixed with 3.5 parts of water.

After having suitably homogenized this first mixture, there is added to it 23 parts of magnesium oxide which leads to the formation of a pourable and moldable paste. It will be noted that the quantity of water introduced into this starting mixture is much lower than that which is generally specified in the prior state of the art.

In the case of producing cladding, the pure paste is poured into a mold bottom and this layer of paste is reinforced by introducing reinforcing fibers and more particularly a glass mat in a proportion of 2 to 5%. It will be noted that such a preparation, whether or not reinforced, had a setting time in ambient air which was too long for commercial production. In accordance with one stage of the present process, which is described further on, the formation of oxichloride is accelerated by triggering an abrupt exothermic reaction at some point in the poured or shaped mixture mass, thereby making it possible to reduce the time from 4 to 5 hours for the known oven heat processes, plus 5 to 6 days of setting for complete hardening, to about 1 hour with the exothermic reaction and consequently it is possible to commercialize this process at lower cost, since it can be practiced in molds operating at atmospheric pressure.

The product is characterized by great hardness and by a fine grained appearance which places it into the category of preclous materials.

The molded product further provides remarkable dimensional stability, extremely low shrinkage during the hardening phase, and if desired a perfectly smooth surface appearance.

The two-component hydraulic resin has exceptional suitability for molding, including very fine striations, without appearance defects occurring during unmolding.

The pure paste is also remarkable in that it is totally incombustible, which makes it possible to completely fireproof structural products, such as aggregates which are inherently combustible, e.g. sawdust, coconut fibers, peanut shells, polystyrene pellets, natural or synthetic foam scraps, etc.

In the pure paste or the mortar it is desirable for certain applications to introduce fillers such as sand, laterite, calcium carbonate, marble powder, the percentage incorporated being in general between 25 and 30%.

According to a particular feature of the present process, among the fillers one can utilize salty sand, which is completely compatible with the two-component hydraulic resin, whereas the presence of salt renders salty deposits useless as an ingredient in mortar which is made from a cement base.

The process according to the invention can be practiced in conformity with any one of the following examples, taken separately or in combination.

By means of the composition of example 1, there is obtained a sample of cladding formed of pure paste supplemented with glass fibers in the form of a glass mat and this sample has been submitted to a compression test:
dimension in cm $10.5 \times 12 \times 0.2$
maximum loading 600 da N
average $\delta$ c 285 da N/cm$^2$ This exceptional strength of the material provides protection from destruction such as has never before been achieved.

Moreover, complete absence of delamination between the pure paste and the glass fibers is noted.

By means of the compositions of examples 1 and 4, there has been obtained a sample of panel comprising a cladding of pure paste and an underlayer of filler mortar incorporating an aggregate of rice pellets:
dimensions in cm: $10.5 \times 12 \times 0.8$
maximum load: 950 da N
average $\delta$ c: 113 da N/cm$^2$ This compression strength makes it possible to obtain bearing walls, as well as roof tiles, or other construction materials which conform to the safety standards applicable to building products.

EXAMPLE 1

To obtain pure paste during the manufacture of cladding layers, the proportions of the components are given in parts by weight:
magnesium chloride: 7
water: 3.5
magnesium oxide: 23
glass mat: 2 to 5%

EXAMPLE 2

Pure paste supplemented by a complementary filler
magnesium chloride: 7
water:3.5
magnesium oxide: 23
sand or laterite 10

EXAMPLE 3

Pure paste supplemented with aggregate to form a filler mortar specifically intended for sandwich panels:
magnesium chloride: 6
water: 5
magnesium oxide: 24
vinyl emulsion: 3
polystyrene pellets: 2

EXAMPLE 4

Pure paste mortar supplemented with vegetable aggregates:
magnesium chloride: 7 water: 3.5 to 4
magnesium oxide: 23
rice pellets: 10 to 13

Figure 4:
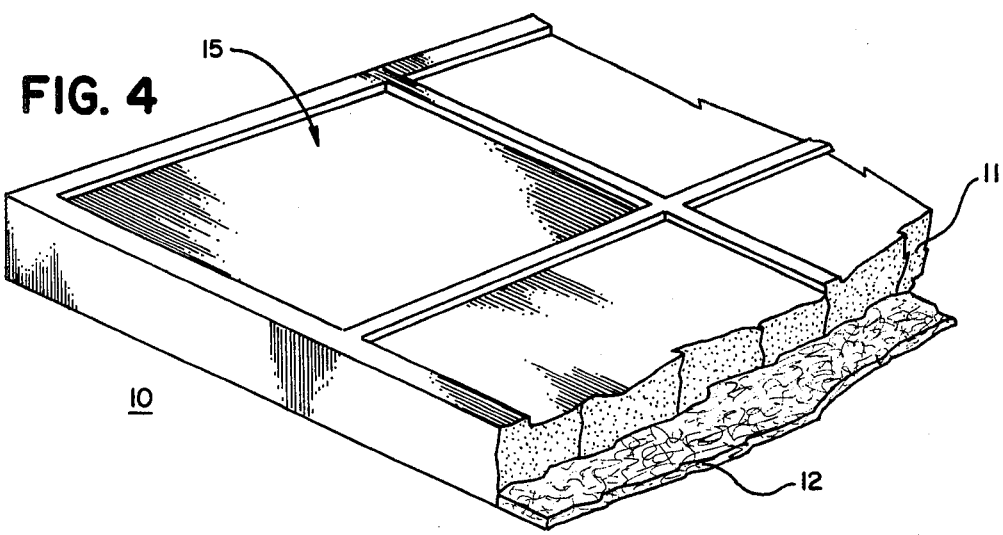
FIG. 4 is a perspective view, partially broken away, showing a cladding layer in accordance with the process of the invention.

In the exemplary embodiment of FIG. 4, there is shown a form of implementation obtained with the formulations of examples 1 and 2. The cladding is designated by the general reference numeral 10. The cladding is formed by a paste 11 which may be filled with sand, laterite, fine sawdust and also with a waterproof sealing emulsion, for example a vinyl emulsion.

As has been indicated, the pure paste is poured into a mold bottom which may include decorative or functional indentations if desired.

While is is still in the pasty state, a glass mat 12 is incorporated into the two-component resn, pre-impregnated with the same resin.

The glass mat consists preferably of short fibers, that is of the order of 5 cm. The reinforcing mat may have been subjected to a protective and binding greasing in order to obtain perfect physio-chemical union between the two-component resin and the glass fibers.

Figure 5:
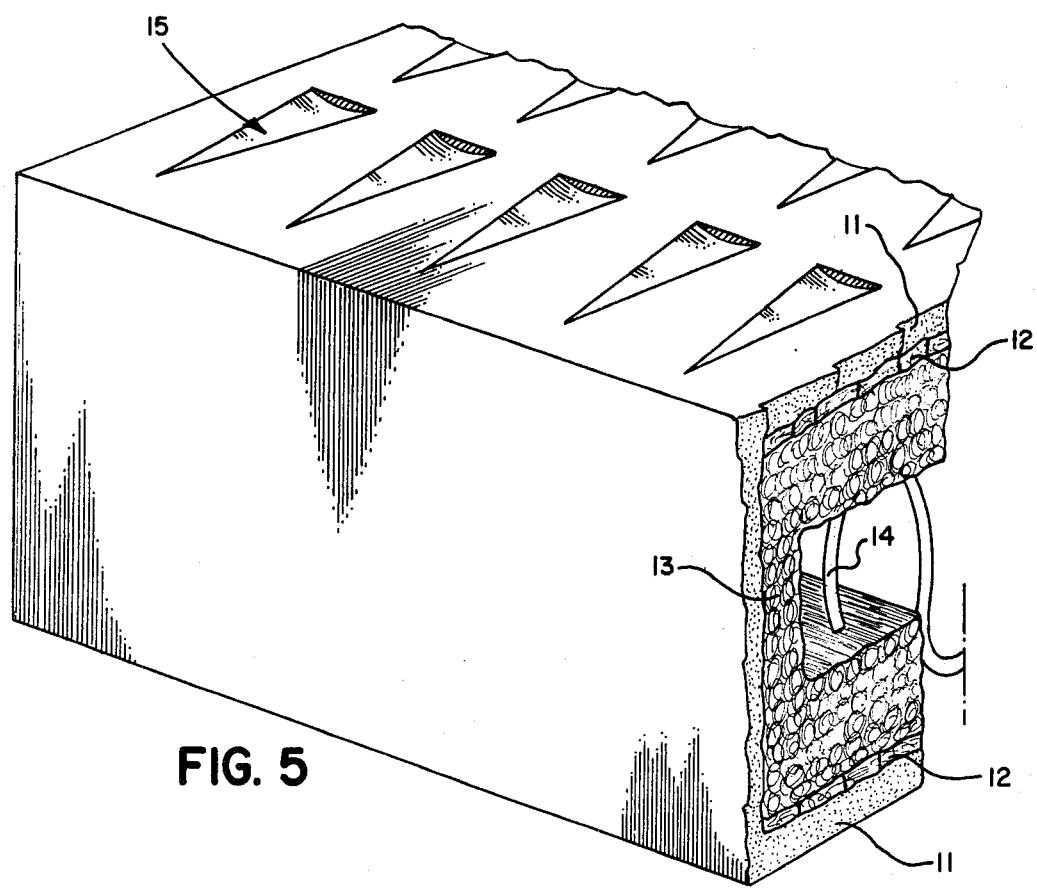
FIG. 5 is a perspective view showing, partly broken away, a structural molded element of sandwich type for a bearing wall, roof tile, etc.

In the mode of realization illustrated in FIG. 5, there is shown an example of a sandwich panel coated on both sides with claddings of the type shown in FIG. 4. To obtain such a panel there is placed in a first mold the two-component resin reinforced with glass mat, then there is superposed on this layer which is destined to constitute the surface skin, a mortar constituted of the same resin but filled with an aggregate, as for example of rice pellets 13.

One can advantageously partially incorporate into that filler mortar, a reinforcement 14 which may, in the example shown, be a binding reinforcement between two halves of the panel. This permits if desired, forming an air space in the core of the panel.

It will also be noted that the two-component resin provides a remarkable capability for reproducing fine or deep depressions or architectural decorations.

Regardless of the example for the preparation of the basic two-component resin, the molded or shaped products are subjected to an exothermic reaction which is triggered in accordance with the examples given hereafter:

EXAMPLE 1

The hydraulic resin is subjected to an ultrasonic radiation at 20 kHz and with an amplitude between 5 and 40$\mu$.

This emission triggers a molecular activity or activation, which manifests itself by the exothermic phenomenon shown in FIG. 1 and with a temperature which always exceeds the indicated point. This phenomenon causes and accelerates the setting process so well that the material thereafter stops working, reaches a condition of stability which remains constant with time.

EXAMPLE 2

The hydraulic resin is subjected to ultraviolet radiation, on the one hand of long waves, on the other hand of short waves.

In the case of long waves, the frequency in Hz cycles per second is between $8 \times 10^{14}$ and $1.5 \times 10^{15}$.

The wave length therefore is between $3.75 \times 10^{-5}$ and $2 \times 10^{-4}$.

In the case of short waves, the frequency in Hz cycles per second is between $1.5 \times 10^{15}$ and $3 \times 10^{16}$.

The wave length is therefore between $2 \times 10^{-5}$ and $2 \times 10^{-6}$.

Regardless of the activating means which are used, there is observed an exothermic phenomenon such as is illustrated particularly in FIG. 1. In that FIG., there is shown along the ordinate the temperature scale, and along the abscissa the time scale. As soon as the starting mixture is subjected to these various treatments, there is observed a temperature rise which proceeds in characteristic manner to reach a maximum of 110° C. at the end of an hour.

At the peak of the reaction there is surprisingly observed the complete ultimate hardening of the mineral resin. Thus the setting time of the resin has been considerably reduced and this demonstrates the possibilities for commercial applications of the present process.

As soon as the maximum reaction temperature has been reached, there is immediately observed a cooling of the product obtained, which simultaneously reaches its ultimate properties.

Figure 2:
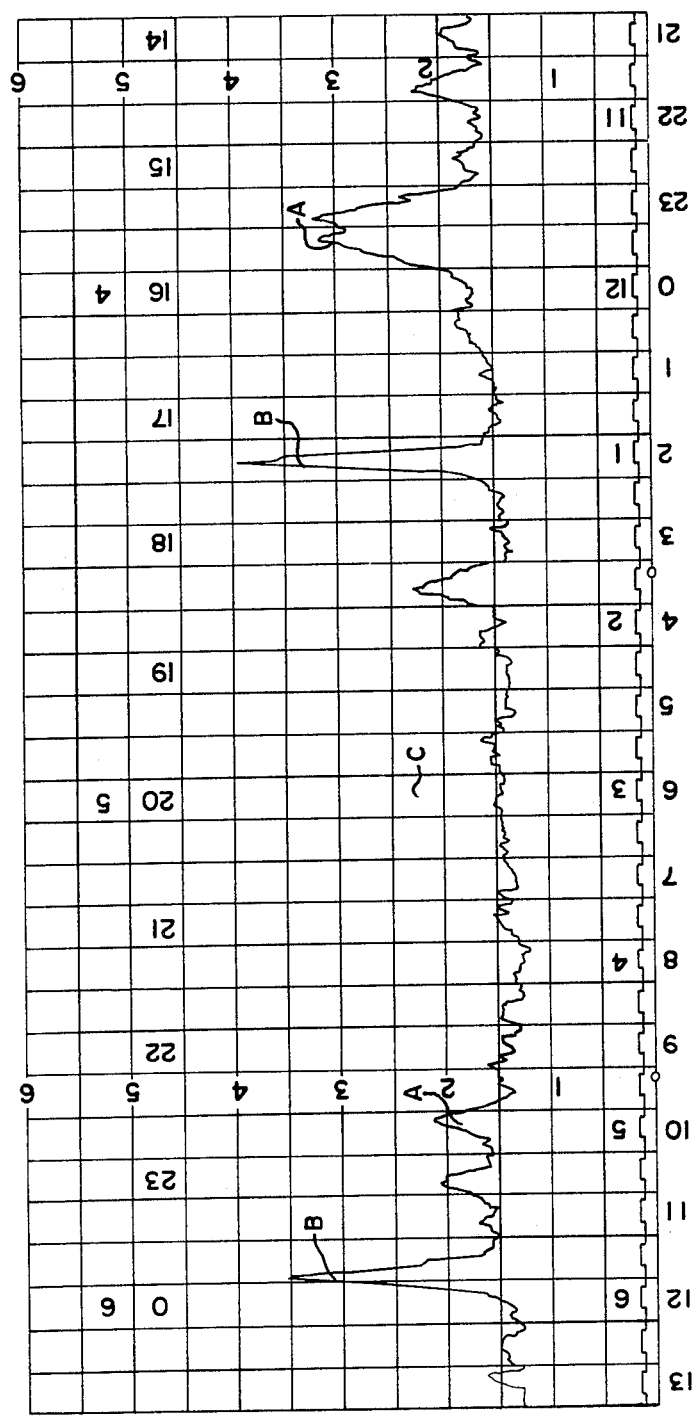
FIGS. 2 and 3 are analytical curves made by means of x-rays, showing the differences in structure between the product obtained by a known process and the product obtained by the process of the present invention.
Figure 3:
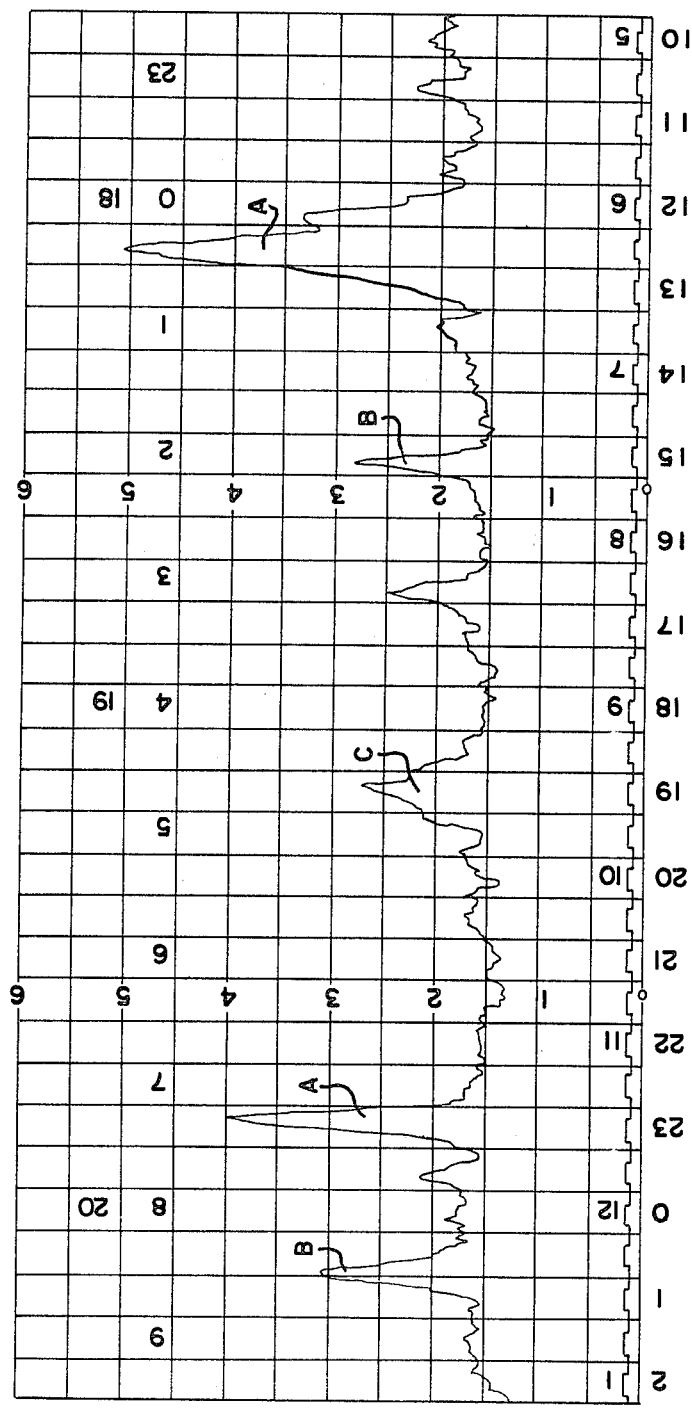

The exothermic phenomenon which has been described is accompanied by a structural modification of the product so obtained, as is particularly discernible from x-ray analysis. FIGS. 2 and 3 are to be read from right to left. It will be recalled that FIG. 3 is the result of analyzing a product activated according to the process of the invention and FIG. 2 is the result of analyzing a prior process of hardening.

In Zone A there is observed an increase in the relative area of certain characteristic peaks. In Zone B there is observed a decrease of existing peaks. At C there is noted the appearance of a new peak. These various observations prove that there is a different molecular arrangement, manifesting itself by suppression of the volumetric and linear shrinkage of the raw product, whether reinforced or filled, and by an improvement of the mechanical properties, as previously indicated.

The improvement in the mechanical properties and in the stability of the product have been put to good use in obtaining laminates with mineral matrices. Thus in surprising manner, there have been produced laminates which were capable of containing up to 50% of glass met or fabric, and corresponding to polyester or organic laminate formulations.

In accordance with the present invention, the exothermic reaction produced by the various means described makes it possible to obtain a expanded product which is lighter and has better performance from the standpoint of heat and sound insulation. In that case, there is introduced into the two-component resin, before triggering the exothermic reaction phase, an expansion agent, preferably in the liquid state, and especially the halogen derivatives of methane and ethane, such as for example the blowing agent designated by the tradename "Freon".

It is appropriate here to point out, in this process, the combination of temperature rise and setting of the mass, in order to explain the ease of formation of a particularly stable expansion product.

Before triggering of the exothermic reaction, there is introduced into the mixture to be expanded a surfactant or film-forming agent having a sequestering action, in order to retain the gases in the mixture during the expansion phase, during which the exothermic reaction is triggered, until complete hardening of the expanded material.

I claim:

1. Manufacturing process for molded products, whether or not expanded, based upon a two-component mineral resin mixture of magnesium oxide and magnesium chloride and water to form a pourable or moldable binder, said process comprising the steps of:
preparing the hydraulic binder by making a mixture comprising
20 to 30% of magnesium chloride and
70 to 80% of magnesium oxide, to which ingredients there is added a quantity of water of between 10 and 35%; and
subjecting the mixture to mechanical or electromagnetic vibrations, including waves of light or nuclear energy sufficient to trigger an abrupt exothermic reaction within the core of the mixture, which causes the temperature of the mixture to spontaneously rise without continued addition of external heat during the entire setting period, whereby the mixture sets and hardens.

2. Process according to claim 1, characterized in that the exothermic reaction is triggered in the core of the two-component raw mixture by subjecting all or a portion of it to a source of ultraviolet radiation.

3. Process according to the claim 1, characterized in that the exothermic reaction is triggered in the core of the two-component raw mixture by subjecting it to ultrasonic vibration.

4. Process according to claim 1, characterized in that, before the triggering of the exothermic phase, there is introduced into the mixture an expansion agent preferably in the liquid state, particularly halogen derivatives of methane and ethane, and the exothermic reaction is used to insure the setting of the material in the expanded state within the foaming period.

5. Process according to claim 4, characterized in that for the production of expanded products, there is introduced into the raw mixture, before expansion, an additive having sequestering action to retain the gases in the mixture during the expansion phase until complete hardening of the expanded material.

6. Process according to claim 1, characterized in that there are introduced into the two-component composition fillers or reinforcing fillers, following a method known in itself, and especially aggregates such as vegetable nodules, expanded polystyrene nodules, organic nodules, glass fibers, rock wool, scraps which may or may not be combustible, the exothermic reaction thereafter taking place unchanged.

7. Manufacturing process for a molded product, whether or not expanded, based upon a multi-component mineral resin, preferably a mixture of magnesium oxide and mangesium chloride and water to form a pourable or moldable binder, whether expandable or not, characterized by the steps of
preparing the hydraulic binder by making a mixture comprising
20 to 30% of magnesium chloride
70 to 80% of magnesium oxide;
adding to these raw materials a quantity of water between 10 and 35%; and,
in order to set and harden the mixture, triggering an abrupt exothermic reaction by subjecting all of the mixture to mechanical or elecromagnetic vibrations, including waves of light or nuclear energy to trigger the exothermic reaction phase, which is due to the formation of crystallized magnesium hydroxide through excitation of magnesium oxide creating conduction electrons outside the valence band and permitting, within the aqueous raw solution, the triggering and rapid production at ambient temperature of the exothermic reaction $Mgo + M_2O \rightarrow Mg(OH_2)$, said reaction being produced directly by the electronic excitation.

* * * * *